United States Patent [19]
Mita

[11] Patent Number: 5,329,382
[45] Date of Patent: Jul. 12, 1994

[54] IMAGE SCANNER
[75] Inventor: Kikuo Mita, Yokohama, Japan
[73] Assignee: Eastman Kodak Company, Rochester, N.Y.
[21] Appl. No.: 805,692
[22] Filed: Dec. 11, 1991
[30] Foreign Application Priority Data Mar. 4, 1991 [JP] Japan .................................. 3-037637

[51] Int. Cl.⁵ .............................................. H04N 1/38
[52] U.S. Cl. ................................... 358/464; 358/463; 358/447; 358/465; 358/448; 358/445; 382/51
[58] Field of Search ............... 358/464, 463, 447, 462, 358/465, 454, 443, 471, 474, 445; 382/51, 50

[56] References Cited

U.S. PATENT DOCUMENTS

| | | | |
|---|---|---|---|
| 4,903,316 | 2/1990 | Hongo et al. | 358/464 |
| 4,919,736 | 12/1990 | Weiman et al. | 382/51 |
| 4,931,881 | 6/1990 | Matsui et al. | 358/464 |
| 4,975,768 | 12/1990 | Takayaga | 358/464 |
| 5,048,096 | 9/1991 | Beato | 358/464 |
| 5,055,944 | 10/1991 | Shibahara | 358/464 |
| 5,081,691 | 1/1992 | Chesley | 382/51 |
| 5,119,211 | 6/1992 | Sakurai | 358/444 |
| 5,138,674 | 8/1992 | Sugawa | 382/51 |
| 5,144,566 | 9/1992 | Anderson et al. | 382/51 |
| 5,157,740 | 10/1992 | Klein et al. | 382/51 |
| 5,166,810 | 11/1992 | Sorimachi et al. | 358/463 |
| 5,166,986 | 11/1992 | Mizuoka et al. | 382/51 |

FOREIGN PATENT DOCUMENTS 57-57089 4/1982 Japan .................................. 358/463

Primary Examiner—Edward L. Coles, Sr.
Assistant Examiner—Fan Lee
Attorney, Agent, or Firm—Raymond L. Owens

[57] ABSTRACT

A document image scanner that converts scanned images for output as bilevel images is provided with a bilevel image filter. The bilevel image filter counts the number of continuous pattern elements in each direction, vertical, horizontal and diagonal, from a specific point and compares the results with a predetermined reference. Patterns falling below the reference value are regarded as resulting from background noise and are erased.

3 Claims, 4 Drawing Sheets

IMAGE SCANNER

BACKGROUND OF THE INVENTION

1. Technical Field

This invention relates to an image scanner that scans images on a document and outputs them as bilevel images for electronic storage, transmission and printing of documents.

2. Description of the Prior Art

Among the advantages of image scanners are that they enable document image storage, transmission, printing and other such processing to be carried out quickly and at low cost. Such scanners are therefore used to convert the patterns making up such images to bilevel image signals corresponding to black and white levels. To ensure that low contrast patterns are also binarized rather than being erased during the conversion process, it is necessary to set the binarization threshold as closely as possible to the background. However, variations in the background brightness caused by paper lint and the like result in the inclusion of granular noise in the bilevel image. This background noise degrades the quality of the bilevel image and also lowers image compression efficiency.

In conventional image scanners, background noise is suppressed either by making all patterns uniformly thin or by the circle method wherein the pixels of interest are compared with surrounding patterns, and if all of the surrounding patterns are the same, the pixels of interest are combined with the surrounding patterns. Making the patterns uniformly thin can, however, result in the erasure of the pattern of interest. With the circle method, an increase in the size of the background noise elements can cause the number of combinations of circles to be compared to increase exponentially, making it difficult to carry out the necessary processing and therefore preventing effective suppression of the background noise. Thus, with conventional image scanning systems it is difficult to binarize the images without erasing low contrast patterns, and it is also difficult to produce bilevel images with low background noise. Accordingly, it will be appreciated that it would be highly desirable to binarize the images without erasing low contrast patterns and to produce bilevel images with low background noise.

SUMMARY OF THE INVENTION

The present invention provides an image scanner that is able to produce high quality bilevel images by effectively suppressing background noise and not erasing patterns of interest, even when binarizing low contrast image patterns. These high quality bilevel images are attained by an image scanner provided with a bilevel image filter which counts the number of continuous patterns in vertical, horizontal and diagonal radial directions from a point, compares the results with a predetermined reference value, and erases patterns which are below the reference value. Because characters and symbols on a document are formed by straight vertical, horizontal and diagonal line segments, when viewed close up, patterns exhibiting low continuity can be considered to be noise. As such, the provision of the bilevel image filter to remove low continuity patterns enables background noise to be effectively eliminated from the bilevel images without erasing patterns of interest.

Further features of the invention, its nature and various advantages will be more apparent from the accompanying drawings and following detailed description of the invention.

DETAILED DESCRIPTION OF THE PREFERRED EMBODIMENTS

Figure 1:
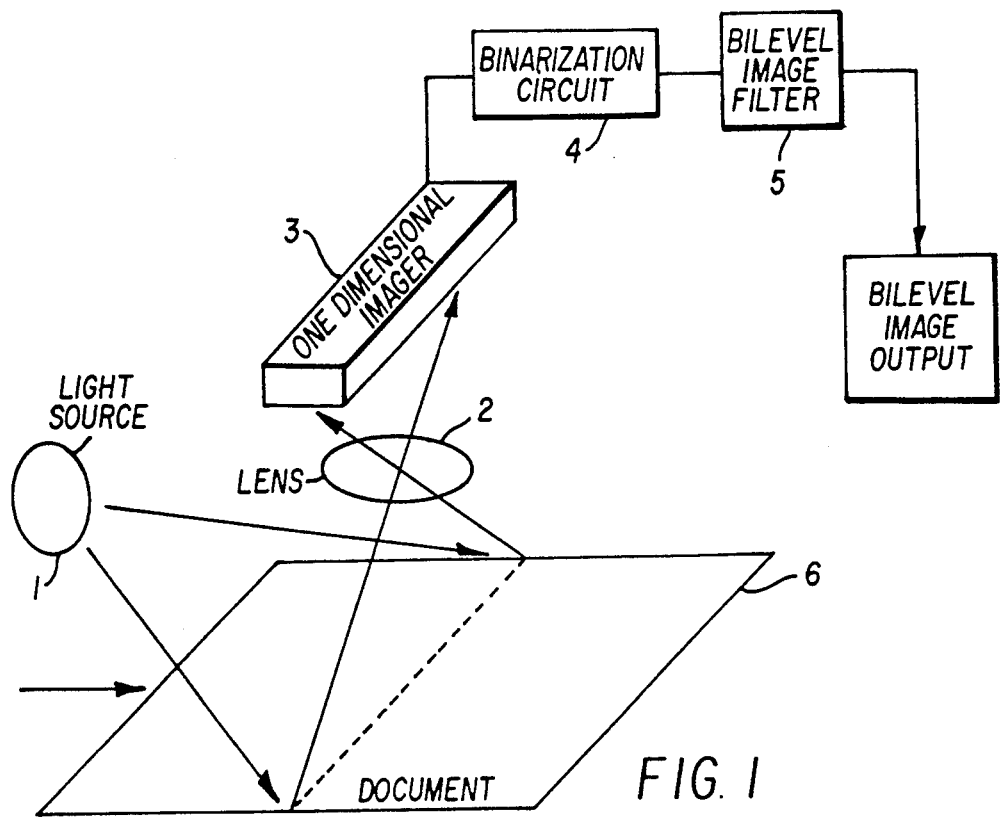
FIG. 1 is a diagram of a preferred embodiment of an image scanner incorporating a bilevel image filter according to the present invention.

FIG. 1 shows the arrangement of the image scanner of the present invention. As can be seen, the image scanner is equipped with a light source 1, lens 2, one dimensional imager 3, binarization circuit 4, and a bilevel image filter 5. The image on a document 6 is formed on the one dimensional imager 3 by the lens 2 and light from the document 6 impinging on the elements of the one dimensional imager 3 are converted to electrical signals that the one dimensional imager 3 outputs to the binarization circuit 4.

As the one dimensional imager 3 converts one line of the image to electrical signals, the document 6 is moved in a set direction one pixel at a time to thereby scan the whole of the document image. The binarization circuit 4 converts the signals coming from the imager 3 to bilevel signals that are then sent to the bilevel image filter 5. The bilevel image filter 5 examines the patterns making up the bilevel images for radial continuity from a specific point in the vertical, horizontal and diagonal directions and erases patterns that show low continuity.

Figure 2A:
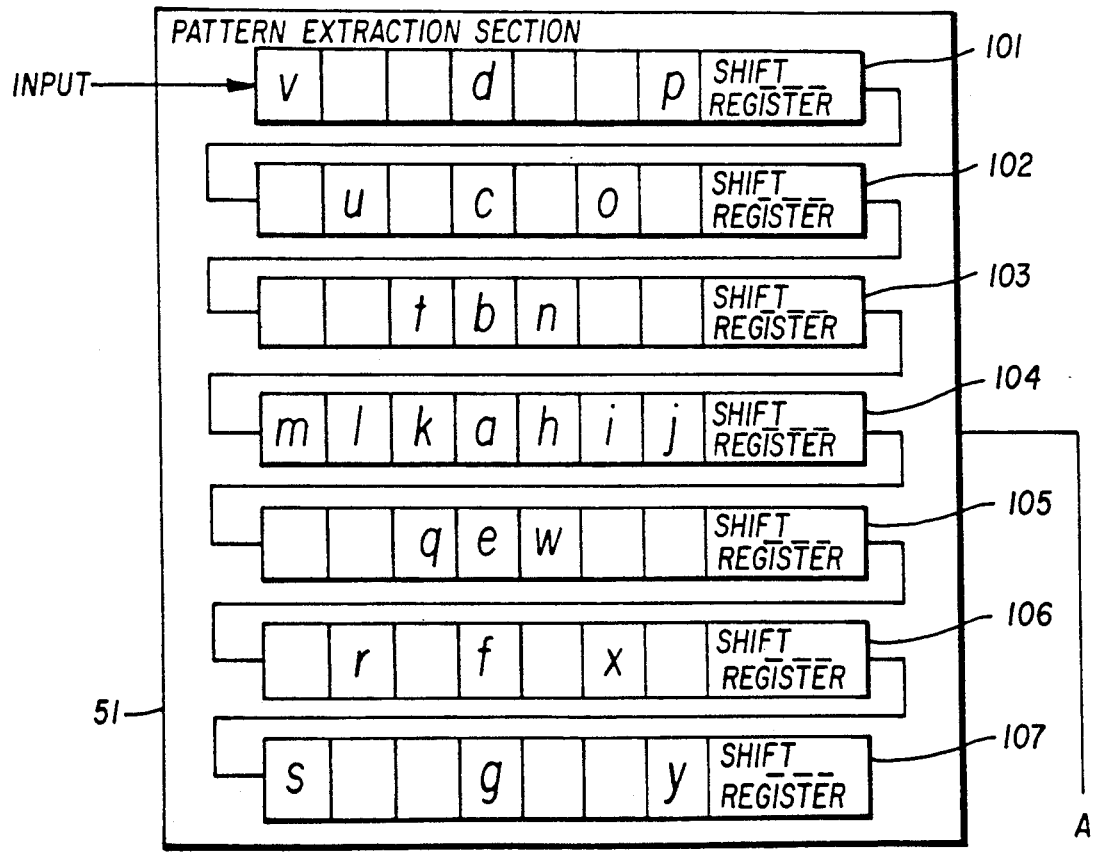
FIG. 2(a) is a diagram illustrating a portion of the bilevel image filter in greater detail to show a priority encoder.
Figure 2B:
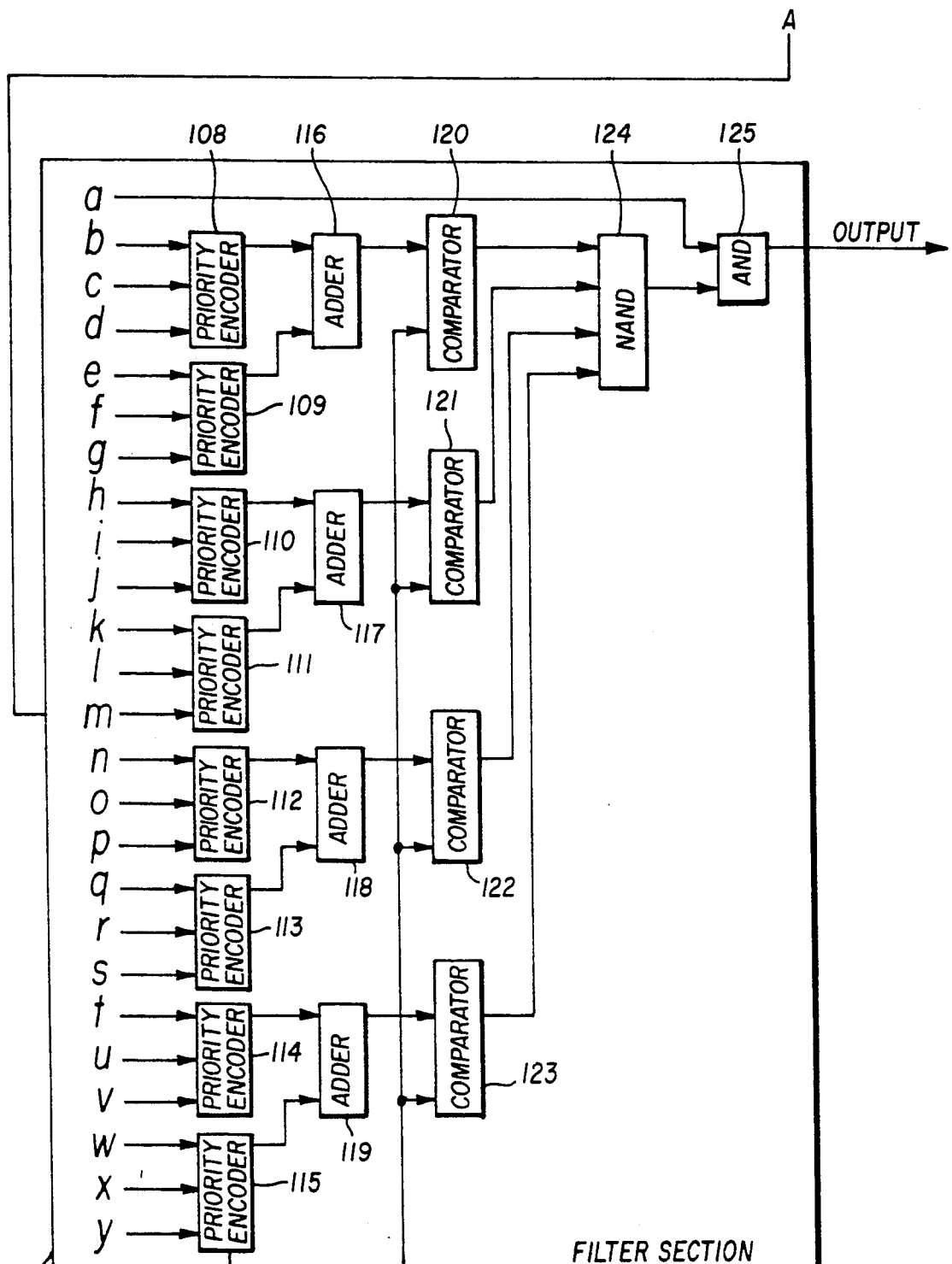
FIG. 2(b) is a diagram illustrating the remaining portion of the bi-level image filter shown in FIG. 2(a).

Referring to FIG. 2(a) and 2(b), the bilevel image filter 5 is shown in greater detail. The bilevel image filter 5 is comprised of seven shift registers 101 to 107. The number of locations of each of these shift registers is the same as the number of constituent elements of the one dimensional imager 3. The bilevel image data from the binarization circuit 4 is input one line at a time into the first shift register 101 of the pattern extraction section 51. The output of the shift register 101 is input into the second shift register 102, and this continues until the data reaches shift register 107.

Extraction points b to y are set radially in the vertical, horizontal and diagonal directions for the shift registers 101 to 107 using extraction point a of the fourth shift register 104 as the starting point. This means that extraction points b to g are set in the vertical direction, points h to m in the horizontal direction, points n to s in the right diagonal direction, and points t to y in the left diagonal direction. The pattern extraction section 51 then extracts the white and black patterns of the bilevel images corresponding to these extraction points a to y, using "0" for white and "1" for black, for example, which is input into the filter section 52.

The filter section 52 is comprised of eight priority encoders 108 to 115, four adders 116 to 119, four comparators 120 to 123, a NAND circuit 124, and an AND circuit 125. The pattern information from the central extraction point a of the pattern extraction section 51 is input to the AND circuit 125, and pattern information on the extraction points in each direction b to g, h to m, n to s, and t to y, is divided into the groups of three locations on each side of the central extraction point a in each direction for input into the priority encoders 108 to 115. The priority encoders 108 to 115 divide continuous black pattern pixels in the extraction points b to g, h to m, n to s, and t to y into two parts, vertically, horizontally and diagonally, and counts continuous pattern elements.

Figure 4:
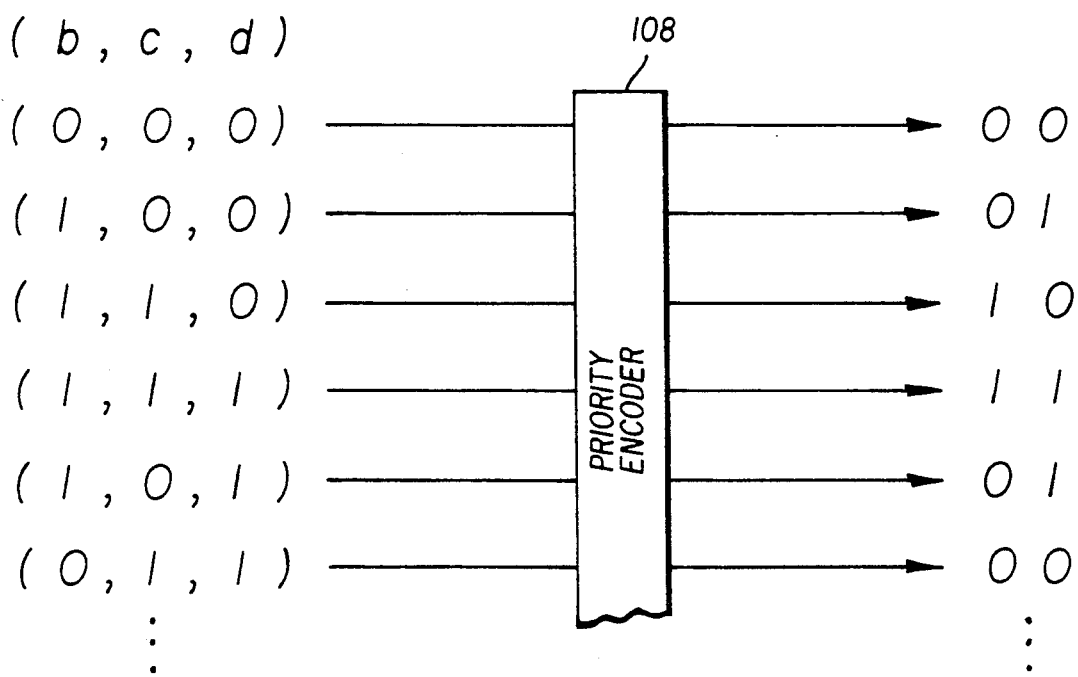
FIG. 4 is a diagram further illustrating the priority encoder of FIGS. 2 and 3.

Referring to FIG. 4, an example using priority encoder 108 will now be described. The priority encoder 108 counts the continuous pattern elements in the vertical direction upward from the central extraction point a (points b, c, d). As shown in FIG. 4, for example, the encoder outputs 00 when the values of input signals (b, c, d) are (0, 0, 0), 01 when the values are (1, 1, 0), 11 when the values are (1, 1, 1), 10 when the values are (1, 0, 1) and 00 when the values are (0, 1, 1); that is, it outbuts the number of continuous 1s from extraction point a. So the priority encoders 108 to 115 thus divide continuous patterns in each direction into two parts and counts the pattern elements, and the values of the two parts in each direction are added by the adders 116 to 119.

The continuous pattern elements in each direction thus counted are each compared to predetermined reference values by the comparators 120 to 123 and the logical product of the comparisons is output by NAND circuit 124. If pattern continuity in all directions is below the reference level, the output of the NAND circuit 124 causes the output of the AND circuit 125 to be defined as "0". This means that the output of the bilevel image filter 5 is "0" regardless of the original image state thereby causing patterns whose continuity falls below the predetermined reference value to be erased.

As all characters and symbols on the document 6 consist of vertical, horizontal and diagonal line segments, patterns showing low continuity can be considered to be background noise. As such, by using. the bilevel image filter 5 to erase patterns with low continuity enables background noise to be effectively removed from the bilevel image without erasing the original patterns of interest. The reference value is set to a level that ensures the optimum removal of background noise by the bilevel image filter 5 without erasure of the patterns of interest.

Figure 3A:
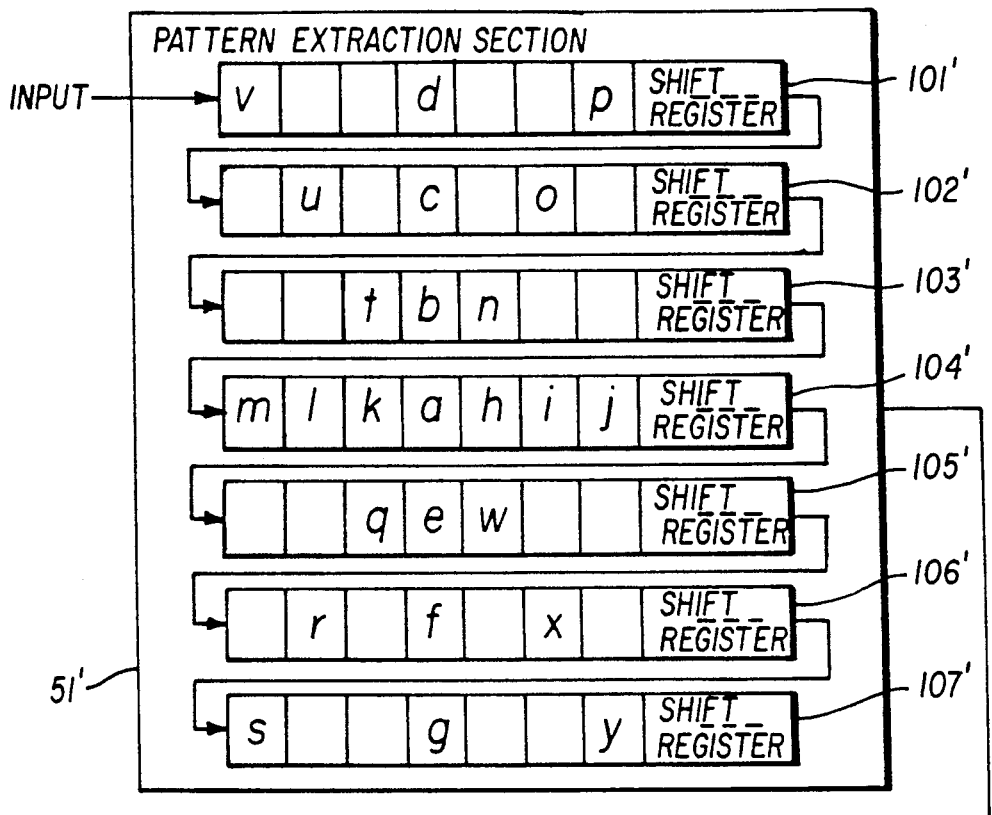
FIG. 3(a) is a diagram similar to FIG. 2, but illustrating a portion of another preferred embodiment.
Figure 3B:
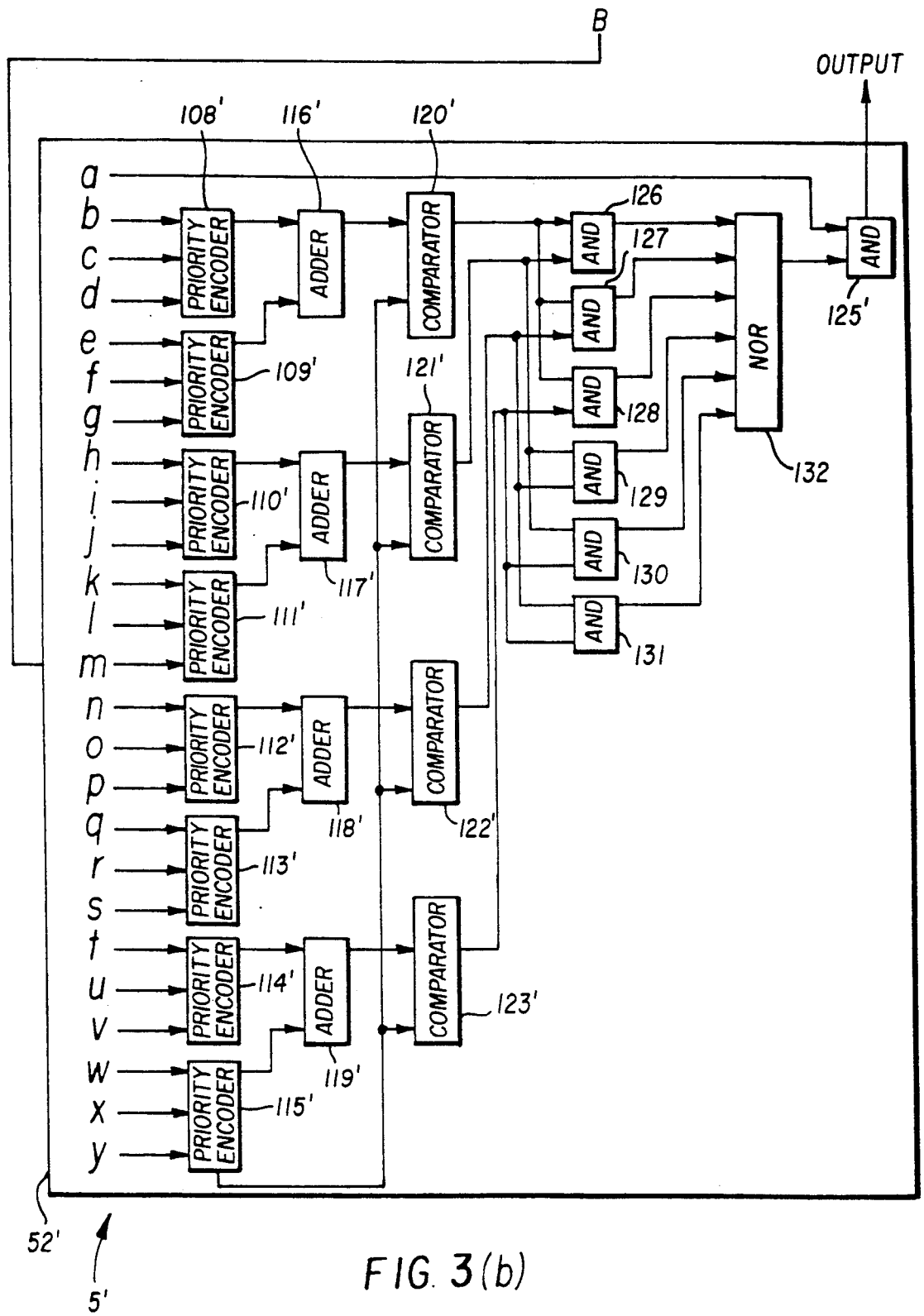
FIG. 3(b) is a diagram illustrating the remaining portion of the embodiment shown in FIG. 3(a).

The bilevel image filter 5 described above is arranged so that it treats as background noise to be removed any pattern that exhibits continuity that is below the reference level in all directions, vertical, horizontal and diagonal. It may however Be arranged to erase patterns that show low continuity in any two of the four directions. In such a case, the embodiment of FIG. 3(a) and 3(b) could be used wherein the outputs of the four comparators 120' to 123' of the filter section 52' are combined into pairs for input to five AND circuits 126 to 131, and the outputs of these AND circuits are input to a single NOR circuit 132. The output of the NOR circuit 132 is then input to the AND circuit 125' together with the pattern information relating to central extraction point a of pattern extraction section 51'. As a result, if pattern continuity in any two directions is below the reference value, the NOR circuit 132 output becomes "0", and, regardless of the original image state, the output of the bilevel image filter 5 becomes "0", causing that pattern to be erased. The embodiment of FIG. 3(a) and 3(b) therefore enables a narrower range of background noise to be removed.

It can now be appreciated that there has been presented a document image scanner that converts scanned images for output as bilevel images. The image scanner produces high quality bilevel images by effectively suppressing background noise and not erasing patterns of interest, even when binarizing low contrast image patterns. These high quality bilevel images are attained by an image scanner provided with a bilevel image filter which counts the number of continuous patterns in vertical, horizontal and diagonal radial directions from a point, compares the results with a predetermined reference value, and erases patterns which are below the reference value. The bilevel image filter counts the number of continuous pattern elements in each direction, vertical, horizontal and diagonal, from a specific point and compares the results with a predetermined reference. Patterns falling below the reference value are regarded as resulting from background noise and are erased. Because characters and symbols oh a document are formed by straight vertical, horizontal and diagonal line segments, when viewed close up, patterns exhibiting low continuity can be considered to be noise. As such, the provision of the bilevel image filter to remove low continuity patterns enables background noise to be effectively eliminated from the bilevel images without erasing patterns of interest.

What is claimed is:

1. An image scanner wherein images on a document are scanned, the scanned images are converted to electrical signals by imager means, the electrical signals are converted to bilevel signals by a binarization circuit, and the bilevel signals are output as bilevel images with pattern elements in vertical, horizontal and diagonal radial directions, the improvement comprising tot:

a bilevel image filter that, with respect tot he patterns comprising the bilevel images, separately counts the number of continuous pattern elements in vertical, horizontal and diagonal radial directions from a specific point, compares the count of continuous pattern elements in each direction with a predetermined reference value, and erase patterns in each direction which are below the reference value.

2. An image scanner for scanning an image existing on a document, comprising:

at least a one dimensional imager wherein said image on said document is formed and converted to an electrical signal;

a binarization circuit receiving said electrical signal and converting said electrical signal to bilevel images with pattern elements in vertical, horizontal and diagonal radial directions; and a bilevel image filter for receiving said bilevel images from said binarization circuit, separtely counting the number of continuous pattern elements in vertical, horizontal and diagonal radial directions from a specific point, comparing the count of continuous pattern elements in each direction with a predetermined reference value, and erasing patterns in each direction which are below the reference value.

3. An image scanner for scanning an image existing on a document, comprising:

at least a one dimensional imager wherein said image on said document is formed and converted to an electrical signal;

a binarization circuit receiving said electrical signal and converting said electrical signal to bilevel images with pattern elements in vertical, horizontal and diagonal radial directions;

means for receiving said bilevel images from said binarization circuit;

means for separately counting the number of continuous pattern elements in vertical, horizontal and radial directions from a specific point;

means for comparing the count of continuous pattern elements in each direction with a predetermined reference value; and means for erasing continuous patterns in each direction whose count is below the reference value.

* * * * *